United States Patent Office 3,155,486
Patented Nov. 3, 1964

3,155,486
METHOD OF CONTROLLING GRAMINACEOUS WEEDS
Herbert Aubrey Stevenson and Edward Levi Leafe, Nottingham, England, assignors to Boots Pure Drug Company Limited, Nottingham, England, a British company
No Drawing. Filed July 13, 1961, Ser. No. 123,670
Claims priority, application Great Britain July 25, 1960
12 Claims. (Cl. 71—2.5)

This invention relates to weedkilling compositions. In particular it relates to new weedkilling compositions which comprise as active ingredient certain dihydrotriazine derivatives, and to the control of weeds by means of said derivatives. It further relates to certain new dihydrotriazine salts and to processes for their preparation.

The control of weeds by chemical means is now common agricultural and horticultural practice, but although there are available a large number of weedkillers, the control of certain weeds is still impossible or difficult to achieve. More particularly the selective control of certain weeds growing in crops, without detrimental effect on the crops, is extremely difficult. Wild oats (*Avena fatua* and *Avena ludoviciana*), for example, fall within this category, and it is common knowledge that in many parts of the world the problem of infestation of crops, particularly the cereals, by wild oats is extremely serious.

It is an object of this invention to provide compositions and methods for the control of weeds, in particular graminaceous weeds. It is a further object of the invention to provide compositions and methods for the selective control of graminaceous weeds in crops. An important object of the invention is the provision of compositions and methods for the control of wild oats, particularly their selective control in crops.

According to the present invention there are provided compositions for the control of weeds which comprise a compound of the general formula:

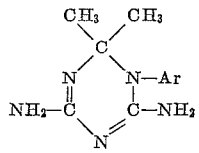

or a salt thereof, wherein Ar represents 3,4 - dichlorophenyl, 3,4-dibromophenyl, 3-chlorophenyl, 4-chlorophenyl, 3-bromo-4-chlorophenyl, 4-bromo-3-chlorophenyl, 4-chloro-3-methylphenyl or 3-bromophenyl, in association with a diluent or carrier.

We have found that the dihydrotriazines of the above general formula possess valuable herbicidal properties which enable them to be used for the control of weeds. This activity is surprising and unexpected and is not possessed by some extremely closely related compounds. Of particular importance is the fact that the compounds are toxic to many graminaceous plants, such as for example wild oats and ryegrass but relatively innocuous towards many broad-leaved plants such as for example peas, sugar beet and the brassicas, and towards such cereals as wheat and barley. Accordingly the compounds off a means of selectively controlling the growth of many graminaceous weeds in such crops as wheat, barley, peas, sugar beet, flax, the brassicas etc. The compounds are particularly herbicidal towards wild oats.

The dihydrotriazines of the above general formula, being bases, form salts with acids, and the salts possess similar activity to that of the parent bases. Therefore the compositions of the invention may contain as active ingredients either the free bases themselves or salts thereof. The salts may be those formed with inorganic or organic acids; typical inorganic acids are hydrochloric, hydrobromic, sulphuric, sulphurous, nitric, phosphoric and carbonic acids; suitable organic acids are the aliphatic or aromatic acids, such as for example acetic, propionic, hexanoic, decanoic, oxalic, lactic, glycollic, formic, citric, tartaric, methane sulphonic, benzoic and gluonic acid. These acids are given by way of example only and are not to be taken as limiting the invention. Salts are prefered to the free bases, being in general more stable and easier to obtain. The hydrochlorides are the cheapest and most readily obtainable forms of the dihydrotriazines and for these reasons are particularly useful. If salts with appreciable water-solubility are required, salts with polyhydroxy aliphatic acids are advantageous.

For the sake of breviey, hereafter the term "active ingredient" will be used to describe the dihydrotriazines of the above general formula and their salts.

The term "compositions for the control of weeds" is intended to mean not only compositions in a suitable form for application but also concentrated compositions which may be supplied to the user and which require dilution with a suitable quantity of water or other diluent before application.

The nature of the diluents or carriers to be used in the compositions of the invention will depend on the physical properties of the active ingredients. Thus some of the salts are substantially water-soluble whereas some are substantially water-insoluble. In general, the diluents or carriers may be selected from those commonly employed in the formulation of weedkilling preparations. Typical compositions falling within the invention include the following:

(a) *Dispersible solutions.*—A dispersible solution comprises a solid, active ingredient of low water solubility dissolved in a water-miscible solvent, with the addition of a dispersing agent, such that an aqueous dispersion is formed on dilution with water.

(b) *Dispersible powders.*—A dispersible powder comprises a solid active ingredient of low water solubility in association with a dispersing agent, and a solid inert diluent if desired, for example kaolin.

(c) *Miscible oils.*—A miscible oil comprises an active ingredient of low solubility dissolved in a water-immiscible solvent with the addition of an emulsifying agent such that an emulsion is formed on dilution with water. Alternatively the user may be supplied with a concentrated emulsion obtained from a miscible oil by the addition of approximately an equal volume of water. Such concentrated emulsions are diluted with an appropriate amount of water before application.

(d) *Concentrated suspension.*—A concentrated suspension comprises a solid, active ingredient of low water solubility milled to a paste with water and a dispersing agent.

(e) *Dusts.*—A dust comprises an active ingredient in association with a solid, pulverulent diluent which may be an inert diluent such as kaolin or a standard agricultural fertiliser.

(f) *Granular solids.*—These comprise an active ingredient associated with similar solid diluents to those which may be employed in the dust compositions, but the mixture is granulated by methods well-known in the art.

(g) *Aqueous solutions.*—Active ingredients which are sufficiently water soluble may be formulated as aqueous solutions.

The dispersible solutions, miscible oils, dispersible powders, concentrated suspensions and aqueous solutions hereinbefore described may also contain a wetting agent if desired.

The materials employed as dispersing, emulsifying or wetting agents in these compositions are preferably of the non-ionic type, for example ethylene oxide condensates of alkylphenols or of alcohols, polyoxyethylene ethers of the sorbitan-fatty acid esters etc., in order to avoid the incompatibility problems associated with the mixing of one ionic compound (the dihydrotriazine salts) with a second ionic compound (an ionic surface active agent).

The compositions of the invention may contain, in addition to the ingredients already mentioned, other conventional additives well-known in the art of weedkiller formulations. Thus for example, compositions intended for dilution and subsequent application as sprays may advantageously contain a conventional anti-foam agent, such as for example liquid paraffin or silicone fluids.

According to a further feature of the invention there is provided a method of controlling weeds which comprises applying thereto a dihydrotriazine of the aforementioned general formula or a salt thereof.

The compounds of the aforementioned general formula (active ingredients) are particularly toxic to susceptible plants when the plants are very young and accordingly they are preferably applied to the weeds by treatment of the soil prior to the emergence of the weeds. The term "applying to the weeds" as used hereafter is therefore intended to include this means of application. Application to the soil may be on the surface only, for example by spraying, or by incorporation in the top few inches of soil, for example by spraying followed by discing or harrowing. In most cases application will be carried out prior to emergence of both weeds and crop, the crop being sown after soil treatment. However, in some cases, for example the control of weeds in winter wheat, the active ingredients may be applied prior to emergence of the weeds but well after emergence of the crop.

The concentration of active ingredient in the compositions of the invention which are applied for weed control is dependent on the particular composition and the type of machine which is to be used. For example in the case of liquid compositions which are applied as sprays, low and high volume sprayers are commonly used to deliver liquid at rates from 5 to 100 gallons/acre, and these require compositions containing different concentrations of active ingredient. From the point of view of weed control the important consideration is the total quantity of active ingredient applied per unit area of soil. This dosage will vary from one compound of the above general formula to another, as all are not equally active, and it will also vary according to the weeds to be controlled. However in general, rates of 1–30 lbs./acre (based on the free bases) will normally be found to be effective.

Of the compounds of the above general formula, 4,6-diamino-1-(3,4-dichlorophenyl)-1,2-dihydro-2,2-dimethyl-1,3,5-triazine and its salts have weed-killing activity very much superior to that of the other compounds, and these are the preferred active ingredients of the compositions of the invention. For previously described reasons the hydrochloride may be used with advantage. The gluconate is also particularly useful as its high water solubility allows its formulation as a concentrated aqueous solution. With these compounds, an application rate of about 1–8 lbs./acre (based on the free base) controls many graminaceous weeds, particularly wild oats, with about 3–6 lbs./acre being generally satisfactory. In particular application of these compounds to the soil containing wild oat seeds prior to weed emergence at a rate of 1–8 lbs./acre (based on the free base), followed by the sowing of wheat or barley, results in the growth of the crop but inhibition of the growth of wild oats. In fact there are indications that the compounds have selectivity between wild oats and cultivated oats (Avena sativa). Soil treated with these compounds remains effective in preventing the growth of wild oats many months after treatment; this is important as it is well known that wild oat seeds frequently germinate over a prolonged period and not all at the same point in time.

The activity of the active ingredients was determined in tests carried out in the folowing manner:

*Screening test.*—Several plant species are sown in shallow trays. The trays are sprayed with aqueous suspensions of the compounds under test, one compound per tray, using a range of dose rates. The effects are assessed after one month. Assessment is carried out by determining the dose at which (*a*) growth is entirely suppressed and (*b*) normal growth occurs. The arithmetic mean of these doses is calculated. In reporting the results, this is referred to for convenience as the "Half Suppression Dose," being the dose halfway between that which results in a complete kill or suppression and that which allows normal growth. Where the highest dose, i.e., 32 lbs./acre, is insufficient to suppress growth entirely, the compound is reported as inactive. Clearly, the lower the half suppression dose, the more active is the compound. The results in this test using the compounds of the above general formula are shown in Table I. It will be seen that the compounds possess selective activity between graminaceous weeds represented by wild oats and broad-leaved plants represented in this test by kale.

TABLE I

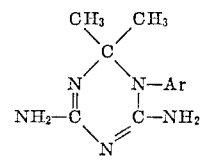

| Ar | Salt forming acid | Half Suppression Doses (lbs./acre) | |
|---|---|---|---|
| | | Kale | Wild oat |
| 3,4-dichlorophenyl | HCl | >32 | 4 |
| Do | H$_2$CO$_3$ | >32 | 2 |
| Do | Acetic | >32 | 4 |
| Do | Propionic | >32 | 2 |
| Do | Hexanoic | >32 | 2 |
| Do | Decanoic | >32 | 2 |
| Do | Nitric | >32 | 4 |
| Do | H$_2$SO$_4$ | >32 | 2 |
| Do | [Free base] | >32 | 4 |
| Do | H$_3$PO$_4$ | | 4 |
| m-Chlorophenyl | HCl | >32 | 12 |
| p-Chlorophenyl | HCl | >32 | 10 |
| 3,4,-dibromophenyl | HCl | >32 | 8 |
| 4-bromo-3-chlorophenyl | HCl | >32 | 8 |
| 3-bromo-4-chlorophenyl | HCl | >32 | 8 |
| 4-chloro-3-methylphenyl | HCl | >32 | 20 |
| m-Bromophenyl | HCl | >32 | 10 |

The following compounds closely related to the compounds included in Table I were inactive against wild oats.

4,6-diamino - [X] - 1:2-dihydro-2:2-dimethyl-1,3,5-triazine hydrochloride wherein X represents:

o-Chlorophenyl  
p-Bromophenyl  
p-Fluorophenyl  
2,3-dichlorophenyl  
2,4-dichlorophenyl  
2,5-dichlorophenyl  
3,5-dichlorophenyl  
2,3:4-trichlorophenyl  
2,4:5-trichlorophenyl  
3,4:5-trichlorophenyl 3-chloro-4-methylphenyl  
3,4-dichloro-5-methylphenyl  
p-Carboxyphenyl  
2,6-dimethylphenyl  
o-Ethylphenyl  
p-Methoxyphenyl  
p-Methylthiophenyl  
p-Nitrophenyl  
p-Dimethylaminophenyl  
m-Trifluoromethylphenyl 4,6 - diamino-1-(3:4-dichlorophenyl)-2-R$_1$-2-R$_2$-1:3:5-triazine hydrochloride wherein R$_1$ and R$_2$ represent

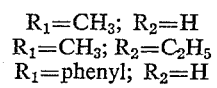

Compounds showing appreciable activity in the screening test were further examined in greenhouse extension tests carried out in the following manner:

*Greenhouse Extension Tests*

The compound under test is incorporated with soil to a depth of three inches in seed pans and wild oats are then sown. The compounds are tested at dose rates equivalent to ½, 1, 2, 4 and 8 lbs./acre, and the results of the treatments are assessed approximately six weeks later. This consists of determining the fresh weight of the aerial parts of the plants; results are expressed as a percentage fresh weight reduction as compared with untreated controls. Results with compounds of the above general formula against wild oats are shown in Table II.

TABLE II

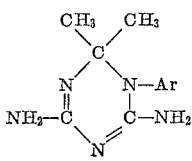

| Ar | Salt forming acid | Percent fresh weight reduction at various doses (lbs./acre) | | | | |
| --- | --- | --- | --- | --- | --- | --- |
| | | ½ | 1 | 2 | 4 | 8 |
| 3:4 dichlorophenyl | HCl | 0 | 34 | 54 | 90 | 93 |
| Do | $H_2CO_3$ | 0 | 5 | 22 | 74 | |
| Do | Acetic | 0 | 0 | 28 | 83 | |
| Do | Propionic | 0 | 20 | 64 | 84 | |
| Do | Hexanoic | 0 | 6 | 56 | 89 | |
| Do | Decanoic | 0 | 16 | 62 | 91 | |
| Do | $H_2SO_4$ | 0 | 31 | 50 | 75 | |
| Do | $H_3PO_4$ | 10 | 22 | 50 | 74 | |
| Do | [Free base] | 10 | 43 | 45 | 71 | |
| m-Chlorophenyl | HCl | | | | | 68 |
| p-Chlorophenyl | HCl | | | | | 40 |
| 3:4 dibromophenyl | HCl | 0 | 0 | 20 | 54 | 62 |
| 4-bromo-3-chlorophenyl | HCl | 0 | 0 | 14 | 53 | |
| 3-bromo-4-chlorophenyl | HCl | 0 | 4 | 21 | 62 | |
| 4-chloro-3-methylphenyl | HCl | 0 | 13 | 33 | 45 | |

[1] Assessed 4 weeks after treatment.

The effect on wild oats, wheat, cultivated oats and barley of 4,6-diamino-(3,4-dichlorophenyl)-1,2-dihydro-2,2-dimethyl-1,3,5-triazine hydrochloride was similarly investigated and the results are shown in Table III. Assessment was carried out 9 weeks after treatment. The marked difference in the effect on wild oats and the effect on wheat, barley and cultivated oats is apparent. [As the method of assessment depends on a comparison of the growth of treated and untreated plants, and the growth of the untreated plants is governed to a large extent by the time of the year and the climatic conditions prevailing at the time of the test, the actual percentage fresh weight reductions obtained with the same compound in different tests may vary. Only figures in the same test are comparable.]

TABLE III

| Plants | Percent fresh weight reduction at various doses (lbs./acre) | | | | |
| --- | --- | --- | --- | --- | --- |
| | ½ | 1 | 2 | 4 | 8 |
| Wild oats | 3 | 29 | 37 | 51 | 77 |
| Wheat | 4 | +4 | +4 | 3 | 13 |
| Barley | +4 | +10 | 7 | +3 | 3 |
| Cultivated oats | +5 | +10 | 8 | 26 | 40 |

+ signifies an increase in percent fresh weight.

The dihydrotriazines of the aforementioned general formula are known compounds, but their salts with alkanoic acids, substituted alkanoic acids, sulphonic acids, carbonic acid and mineral acids (with the exception of hydrochloric acid) have not hitherto been described. In particular salts of 4,6-diamino-1-(3,4-dichlorophenyl)-1,2-dihydro-2,2-dimethyl-1,3,5-triazine with alkanoic acids, substituted alkanoic acids, sulphonic acids, carbonic acid and mineral acids other than hydrochloric acid are novel compounds.

The new salts may be prepared in a variety of ways, the method of choice for any particular salt depending on the nature of the acid and the physical properties of the salt. Thus, for example, several of the salts may be prepared by reaction of the appropriately substituted aniline, e.g., 3,4-dichloroaniline, acetone and dicyandiamide in the presence of the appropriate acid, the required salt being isolated directly from the reaction mixture. 3,4-dichlorophenylbiguanide may be used in place of 3,4-dichloroaniline and dicyandiamide. Some of the salts may be prepared by metathesis from other salts and, for this purpose, the carbonic acid salts are particularly useful starting materials. These salts are prepared from more soluble salts, for example the hydrochlorides by metathesis. As a further alternative, the new salts may be prepared by reaction of the free bases with the appropriate acid. The metathesis reactions may be carried out in aqueous solution, in a solvent such as methanol or in the absence of a solvent in the case of liquid acids, such as some of the alkanoic acids. The crystallisation of the required salt may be caused by concentration of the solutions or by adding thereto a suitable non-solvent such as ether.

The preparation of some typical new salts of 4,6-diamino - 1 - (3,4-dichlorophenyl)-1,2-dihydro-2,2-dimethyl-1,3,5-triazine may be carried out as follows:

(a) 4,6 - diamino-1-(3,4-dichlorophenyl)-1,2-dihydro-2,2-dimethyl-1,3,5-triazine hydrochloride (32.3 gm.) was dissolved in warm water (1.5 litres), the solution cooled and an aqueous solution of sodium bicarbonate (20 gm.) added. After keeping at 0° C. overnight, the crystalline bicarbonate was obtained, M.P. 192–194° C.

(b) The above-bicarbonate (3.47 gm.) was warmed with acetic acid until a clear solution was obtained and evolution of carbon dioxide had ceased. After dilution with ether (200 ml.) the resulting precipitate was collected, dissolved in methanol and re-precipitated with ether to give the acetate, M.P. 153–155° C.

Similarly the propionate, M.P. 133–135° C.; hexanoate, M.P. 134–136° C.; and decanoate, M.P. 106–108° C.; were prepared.

(c) 3,4-dichloroaniline (32.4 gm.) and acetone (250 ml.) were mixed and concentrated nitric acid (8.75 ml.) was added with stirring. Dicyandiamide (18 gm.) was then added and the mixture refluxed for 17 hours. After cooling to 0° C., the precipitate was recrystallised from ethanol to give the required nitrate, M.P. 180–181° C.

(d) The bicarbonate (3.23 gm.) was shaken with N/10 sulphuric acid (100 ml.) until a clear solution was obtained. Concentration of this solution to about 30 ml., hot filtration and cooling gave the sulphate, M.P. 230–233° C.

(e) The bicarbonate (6.96 gm.) was added to a solution of phosphoric acid (90 w./v., 2.18 gm.) in methanol (30 ml.). The resulting solution was evaporated to dryness, the residue dissolved in a minimum amount of water, filtered and the dihydrogen phosphate precipitated by the addition of about 4 volumes of ethanol, M.P. 162–164° C./dec. Recrystallisation from aqueous ethanol gave the pure dihydrogen phosphate, M.P. 152–154° C.

(f) The bicarbonate (5 gm.) and lactic acid (2 gm.) were dissolved in methanol (30 ml.), the solution filtered and the lactate precipitated by the addition of ether. This was redissolved in methanol and re-precipitated with ether to give the lactate, M.P. 140–141° C.

Similarly there were prepared the formate, M.P. 150–151° C.; and the glycollate, M.P. 145–146° C.

(g) The bicarbonate (13.92 gm.) was dissolved in a solution of gluconic acid (7.84 gm.) in water (50 ml.). The resulting clear solution was evaporated on the steam bath under reduced pressure and the glassy residue was dissolved in boiling methanol (100 ml.). After filtration the solution was again evaporated under reduced pressure and the gluconate obtained as a glassy solid, with an indistinct melting point 70–80° C.

(*h*) The bicarbonate (3.48 gm.), citric acid monohydrate (3.1 gm.) and water (25 ml.) were heated to boiling point. On cooling, the crystalline citrate was obtained, M.P. 175–178° C.

(*i*) 3,4-dichloroaniline (162 gm.), 46.2% w./w. hydrobromic acid (121 ml.) and dicyandiamide (90 gm.) were boiled in acetone (1 litre) under reflux with stirring for 18 hours. The reaction mixture was cooled, filtered and the solid washed with acetone. The hydrobromide so obtained melted at 198–200° C.

(*j*) The bicarbonate (3.48 gm.) was added to a solution of oxalic acid (0.9 gm.) in water (10 ml.) and the mixture boiled. After filtration, the mixture was cooled to obtain the oxalate, M.P. 174–178° C. (decomp.).

(*k*) The hydrochloride (3.23 gm.) and sodium bisulphite (1.04 gm.) were boiled with water (80 ml.). On cooling the required bisulphite was obtained, M.P. 192–195° C. (decomp.).

(*l*) The bicarbonate (3.48 gm.) was boiled with methane sulphonic acid (0.96 gm.) and water (15 ml.). After cooling, the methane sulphonate was obtained, M.P. 176–178° C. (decomp.).

Active ingredients of varying solubilities may be provided by variation of the anion of the dihydrotriazine salts. Thus for example, in the case of salts of 4,6-diamino - 1 - (3,4-dichlorophenyl)-1,2-dihydro-2,2-dimethyl-1,3,5-triazine, the approximate water-solubilities at 20° C. of various salts are (percent w./v.):

| | |
|---|---|
| Hydrochloride | 2.5 |
| Bicarbonate | <0.1 |
| Decanoate | <0.1 |
| Sulphate | <0.1 |
| Acetate | 7.5 |
| Oxalate | 1 |
| Dihydrogen phosphate | 27 |
| Lactate | 10 |
| Glycollate | 7.7 |
| Formate | 9 |
| Gluconate | >50 |
| Bisulphite | <1 |

[A solid hydrate separates in some cases on standing.]

It will be noted that the gluconate is very much more soluble than the other salts and for this reason, it is advantageously used in the formulation of liquid concentrates.

4,6 - diamino - 1-(3,4-dichlorophenyl)-1,2-dihydro-2,2-dimethyl-1,3,5-triazine gluconate may be prepared by the methods hereinbefore described for the dihydrotriazine salts. These methods include:

(*a*) Interaction of the free base and gluconic acid.

(*b*) Interaction of gluconic acid with a salt of the free base and an acid weaker than gluconic acid.

(*c*) Interaction of gluconic acid with a salt of the free base and an acid, the anhydride of which is volatile, e.g., carbonic or sulphurous acids.

(*d*) Interaction of a salt of the dihydrotriazine and a gluconate, the anion of the base salt and the cation of the gluconate being so chosen that a substantially insoluble salt is formed on combination thereof, e.g., the reaction of the dihydrotriazine sulphate and calcium or barium gluconate.

Salts formed with the dihydrotriazines and polybasic acids may frequently be further solubilised by forming therefrom salts with the acid radicals not utilised by the dihydrotriazines.

The following non-limitative examples illustrate the invention.

*Example 1*

In the preparation of a dust 10 parts by weight of 4,6-diamino - 1-(3,4-dichlorophenyl)-1,2-dihydro-2,2-dimethyl-1,3,5-triazine hydrochloride were intimately mixed with 90 parts by weight of kaolin.

*Example 2*

In the preparation of a dispersible powder, 98.5 parts by weight of 4,6-diamino-1-(3,4-dichlorophenyl)-1,2-dihydro-2,2-dimethyl-1,3,5-triazine hydrochloride were intimately mixed with 1 part by weight of Ethylan C.P. (a proprietary dispersing agent which is a polyethylene oxide condensate of octylphenol) and 0.5 part by weight of liquid paraffin. The mixing was carried out by spraying the active ingredient with a solution of the other ingredients in a volatile solvent, and subjecting the mixture to hammer-milling.

*Example 3*

A dispersible powder was prepared by intimately mixing 99.5 parts by weight of 4,6-diamino-1-(3,4-dichlorophenyl) - 1,2 - dihydro-2,2-dimethyl-1,3,5-triazine hydrochloride and 0.5 part by weight of Tween 60 (polyoxyethylene sorbitan monostearate).

*Example 4*

A dispersible powder was prepared by intimately mixing 98.5 parts by weight of 4,6-diamino-1-(3,4-dichlorophenyl - 1,2 - dihydro - 2,2-dimethyl-1,3,5-triazine hydrochloride, 1 part of Tween 60 and 0.5 part of liquid paraffin.

Similar compositions to those described in Examples 1–4 were prepared containing other compounds of the above general formula and their salts as active ingredient.

*Example 5*

4,6 - diamino - 1-(3,4-dichlorophenyl)-1,2-dihydro-2,2-dimethyl-1,3,5-triazine hydrochloride (50 gm.) was added portionwise with stirring to a solution of sodium bicarbonate (30 gm.) in water (400 ml.). The mixture was stirred for a further 2½ hours and then filtered. The 4,6-diamino - 1 - (3,4 - dichlorophenyl)-1,2-dihydro-2,2-dimethyl-1,3,5-triazine bicarbonate so obtained was then added to a warm solution of gluconic acid (24.3 gm.) in a little water and the volume adjusted to 144 ml. by the addition of water to obtain a 50% w./v. solution of 4,6-diamino - 1-(3,4-dichlorophenyl)-1,2-dihydro-2,2-dimethyl-1,3,5-triazine gluconate.

The starting material was prepared by heating under reflux for 18 hours a mixture of 3,4-dichloraniline (162 gm.), concentrated hydrochloric acid (87.5 ml.), dicyandiamide (90 gm.) and acetone (1 litre), cooling the reaction mixture and washing the solid so obtained with acetone. The hydrochloride so obtained melted at 205–207° C.

*Example 6*

A dispersible powder was prepared by intimately mixing 84.5 parts by weight of 4,6-diamino-1-(3,4-dichlorophenyl) - 1,2 - dihydro-2,2-dimethyl-1,3,5 - triazine hydrochloride 15 parts by weight of Leveller T (a proprietary dispersing agent which is believed to be the sodium salt of an alkylnaphthalene sulphonic acid) and 0.5 part by weight of sodium stearate.

The compositions described in Examples 2–6 are suitable for addition to water to give sprayable preparations. Such preparations may conveniently contain the equivalent of about 4 lbs. of 4,6-diamino-1-(3,4-dichlorophenyl)-1,2-dihydro-2,2-dimethyl-1,3,5-triazine per 20 gallons for spraying at a rate of 20 gallons per acre.

*Example 7*

4,6-diamino-1-(3,4-dichlorophenyl)-1,2-dihydro-2,2-dimethyl-1,3,5-triazine hydrochloride (50 gm.) was suspended in iced water (500 ml.), and 5 N sodium hydroxide solution (40 ml.) was added dropwise with stirring, maintaining the temperature of the reaction medium at 0–5° C. After stirring for ½ hour, the mixture was filtered and the isolated 4,6 - diamino - 1 - (3,4 - dichlorophenyl) - 1,2 - dihydro - 2,2 - dimethyl - 1,3,5-triazine was washed with water until chloride free. The damp filter cake was then treated with gluconic acid (30.3 gm.) in water (100 ml.); after filtration the clear solution was evaporated to dryness under reduced pressure to obtain 4,6 - diamino - 1 - (3,4 - dichlorophenyl) - 1,2 - dihydro-2,2-dimethyl-1,3,5-triazine gluconate.

In a similar experiment, the final solution of the gluconate was partially evaporated to give a 50% w./v. aqueous solution of the gluconate, a liquid concentrate suitable for supplying to the user for dilution and spraying.

We claim:

1. A method of selectively controlling graminaceous weeds in a crop which comprises applying to the weeds an agent selected from the group consisting of compounds of the formula:

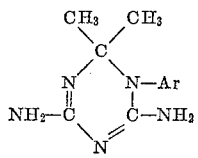

and acid addition salts thereof, wherein Ar represents a radical selected from the group consisting of 3,4-dichlorophenyl, 3,4 - dibromophenyl, 3 - chlorophenyl, 4 - chlorophenyl, 3-bromo-4-chlorophenyl, 4-bromo-3-chlorophenyl, 4-chloro-3-methylphenyl and 3-bromophenyl, said agent being employed at a dosage exerting a phytotoxic action against the weeds but substantially non-phytotoxic to the crop.

2. A method of selectively controlling wild oats in a crop which comprises applying to the wild oats an agent selected from the group consisting of compounds of the formula:

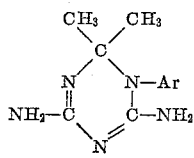

and acid addition salts thereof, wherein Ar represents a radical selected from the group consisting of 3,4-dichlorophenyl, 3,4 - dibromophenyl, 3 - chlorophenyl, 4 - chlorophenyl, 3-bromo-4-chlorophenyl, 4-bromo-3-chlorophenyl, 4-chloro-3-methylphenyl and 3-bromophenyl, said agent being employed at a dosage exerting a phytotoxic action against the wild oats but substantially non-phytotoxic to the crop.

3. A method according to claim 1 wherein said agent is employed at a dosage of 1-30 lbs. per acre, (calculated as free base).

4. A method of selectively controlling wild oats in a wheat crop which comprises applying to the wild oats 4,6 - diamino - 1 - (3,4 - dichlorophenyl) - 1,2-dihydro-2,2-dimethyl-1,3,5-triazine hydrochloride at a dosage of 1-8 lbs. per acre, (calculated as free base).

5. A method of selectively controlling wild oats in a wheat crop which comprises applying to the wild oats 4,6-diamino - 1 - (3,4 - dichlorophenyl) - 1,2 - dihydro - 2,2-dimethyl-1,3,5-triazine gluconate at a dosage of 1-8 lbs. per acre, (calculated as free base).

6. A method of selectively controlling wild oats in a barley crop which comprises applying to the wild oats 4,6-diamino - 1 - (3,4 - dichlorophenyl) 1,2 - dihydro - 2,2-dimethyl-1,3,5-triazine hydrochloride at a dosage of 1-8 lbs. per acre, (calculated as free base).

7. A method of selectively controlling wild oats in a barley crop which comprises applying to the wild oats 4,6-diamino - 1 - (3,4 - dichlorophenyl) - 1,2 - dihydro - 2,2-dimethyl-1,3,5-triazine gluconate at a dosage of 1-8 lbs. per acre, (calculated as free base).

8. A method according to claim 1 wherein 4,6-diamino-1 - (3,4 - dichlorophenyl)-1,2-dihydro-2,2-dimethyl-1,3,5-triazine is applied at a dosage of 1-8 lb. per acre.

9. A method according to claim 1 wherein an acid addition salt of 4,6-diamino - 1 - (3,4-dichlorophenyl)-1,2-dihydro-2,2-dimethyl-1,3,5-triazine is applied at a dosage of 1-8 lb. per acre (calculated as free base).

10. A method according to claim 9 wherein said agent comprises 4,6 - diamino - 1 - (3,4-dichlorophenyl)-1,2-dihydro-2,2-dimethyl-1,3,5-triazine hydrochloride.

11. A method according to claim 2 wherein 4,6-diamino -1 - (3,4 - dichlorophenyl) - 1,2 - dihydro - 2,2-dimethyl-1,3,5-triazine is applied at a dosage of 1-8 lb. per acre.

12. A method according to claim 2 wherein an acid addition salt of 4,6-diamino-1-(3,4-dichlorophenyl)-1,2-dihydro-2,2-dimethyl-1,3,5-triazine is applied at a dosage of 1-8 lb. per acre (calculated as free base).

References Cited in the file of this patent

UNITED STATES PATENTS

| | | |
|---|---|---|
| 2,803,628 | Crowther | Aug. 20, 1957 |
| 2,891,855 | Gysin et al. | June 23, 1959 |
| 2,900,385 | Modest | Aug. 18, 1959 |
| 2,936,227 | Gysin et al. | May 10, 1960 |